United States Patent
Nakfoor

(10) Patent No.: US 8,131,572 B2
(45) Date of Patent: *Mar. 6, 2012

(54) ELECTRONIC TICKETING SYSTEM AND METHOD

(75) Inventor: Brett Nakfoor, Chicago, IL (US)

(73) Assignee: Flash Seats, LLC, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/320,287

(22) Filed: Dec. 16, 2002

(65) Prior Publication Data

US 2003/0093387 A1    May 15, 2003

Related U.S. Application Data

(63) Continuation of application No. 09/590,455, filed on Jun. 9, 2000, now Pat. No. 6,496,809.

(51) Int. Cl.
*G06Q 10/00* (2012.01)
(52) U.S. Cl. ............... 705/5; 705/6; 705/37; 705/64; 705/80; 235/380; 235/382
(58) Field of Classification Search ............... 705/26, 705/27, 65, 67, 72, 76, 80, 13, 37, 57, 5, 705/6; 235/380, 382, 382.5
See application file for complete search history.

(56) References Cited

U.S. PATENT DOCUMENTS

| | | | |
|---|---|---|---|
| 3,622,995 A * | 11/1971 | Dilks et al. | ................. 705/5 |
| 4,086,475 A | 4/1978 | Churchill | |
| 5,021,593 A * | 6/1991 | Nohira et al. | ............ 556/20 |
| 5,124,535 A | 6/1992 | Kocznar et al. | |
| 5,202,550 A | 4/1993 | Kocznar et al. | |
| 5,243,331 A * | 9/1993 | McCausland et al. | ........ 345/172 |
| 5,382,781 A | 1/1995 | Inoue | |
| 5,459,306 A | 10/1995 | Stein et al. | |
| 5,478,995 A | 12/1995 | Wallerstorfer et al. | |
| 5,598,477 A * | 1/1997 | Berson | ...................... 380/51 |

(Continued)

FOREIGN PATENT DOCUMENTS

EP    0 428 233 A1 *  5/1991

(Continued)

OTHER PUBLICATIONS

Anonymous, "Online Movie Ticket Site Launched in China", China Online, Dialog File 20:Dialog Global Reporter, Dec. 23, 1999.*

(Continued)

*Primary Examiner* — Andrew J. Fischer
*Assistant Examiner* — Mamon Obeid
(74) *Attorney, Agent, or Firm* — Hamilton, Brook, Smith & Reynolds, P.C.

(57) ABSTRACT

The present disclosure provides a method of electronically exchanging tickets for an event in a secondary market from ticket sellers to ticket buyers located at remote terminals. The method comprises associating the tickets with the authentication data of the ticket seller, receiving from ticket sellers electronic asks comprising an ask quantity and an ask price, receiving from a ticket buyer an electronic bid comprising a bid quantity and a bid price, comparing the bid to the asks, completing a transfer of the tickets when the bid price equals the ask price and the ask quantity is equal to or greater than the bid quantity, and reassociating the tickets with authentication data of the ticket buyer. Also disclosed is a system for performing the method.

6 Claims, 4 Drawing Sheets

U.S. PATENT DOCUMENTS

| | | | |
|---|---|---|---|
| 5,724,520 A * | 3/1998 | Goheen | 395/205 |
| 5,754,654 A | 5/1998 | Hiroya et al. | |
| 5,794,207 A | 8/1998 | Walker et al. | |
| 5,797,127 A | 8/1998 | Walker et al. | |
| 5,835,087 A | 11/1998 | Herz et al. | |
| 5,866,889 A | 2/1999 | Weiss et al. | |
| 5,894,277 A | 4/1999 | Keskin et al. | |
| 5,897,620 A | 4/1999 | Walker et al. | |
| 5,930,761 A | 7/1999 | O'Toole | |
| 5,940,835 A * | 8/1999 | Sit | 707/102 |
| 5,948,040 A | 9/1999 | DeLorme et al. | |
| 5,949,875 A | 9/1999 | Walker et al. | |
| 5,974,396 A | 10/1999 | Anderson et al. | |
| 6,023,685 A * | 2/2000 | Brett et al. | 705/37 |
| 6,055,513 A | 4/2000 | Katz et al. | |
| 6,067,532 A * | 5/2000 | Gebb | 705/37 |
| 6,085,976 A * | 7/2000 | Sehr | 235/384 |
| 6,107,932 A * | 8/2000 | Walker et al. | 340/825.31 |
| 6,119,096 A * | 9/2000 | Mann et al. | 705/5 |
| 6,119,945 A * | 9/2000 | Muller et al. | 235/492 |
| 6,173,209 B1 * | 1/2001 | Laval et al. | 700/91 |
| 6,175,922 B1 | 1/2001 | Wang | |
| 6,192,349 B1 * | 2/2001 | Husemann et al. | 705/65 |
| 6,216,227 B1 * | 4/2001 | Goldstein et al. | 713/172 |
| 6,223,166 B1 * | 4/2001 | Kay | 705/26 |
| 6,240,396 B1 * | 5/2001 | Walker et al. | 705/26 |
| 6,266,651 B1 * | 7/2001 | Woolston | 705/27 |
| 6,308,159 B1 * | 10/2001 | Strol | 705/5 |
| 6,336,095 B1 * | 1/2002 | Rosen | 705/1 |
| 6,360,254 B1 | 3/2002 | Linden et al. | |
| 6,360,953 B1 | 3/2002 | Lin et al. | |
| 6,363,351 B1 * | 3/2002 | Moro | 705/1 |
| 6,470,451 B1 * | 10/2002 | Weinstein | 713/185 |
| 6,496,809 B1 * | 12/2002 | Nakfoor | 705/80 |
| 6,523,116 B1 * | 2/2003 | Berman | 713/182 |
| 6,617,960 B1 | 9/2003 | Fischer et al. | |
| 6,738,750 B2 * | 5/2004 | Stone et al. | 705/26 |
| 6,779,721 B2 | 8/2004 | Larson et al. | |
| 6,842,741 B1 * | 1/2005 | Fujimura | 705/59 |
| 6,871,186 B1 | 3/2005 | Tuzhilin et al. | |
| 6,889,098 B1 | 5/2005 | Laval et al. | |
| 6,920,431 B2 * | 7/2005 | Showghi et al. | 705/15 |
| 6,999,936 B2 * | 2/2006 | Sehr | 705/5 |
| 7,093,130 B1 * | 8/2006 | Kobayashi et al. | 713/176 |
| 7,280,975 B1 | 10/2007 | Donner | |
| 7,308,426 B1 | 12/2007 | Pitroda | |
| 7,775,429 B2 * | 8/2010 | Radicella et al. | 235/380 |
| 8,065,226 B2 * | 11/2011 | Rizzo et al. | 705/39 |
| 8,070,061 B2 * | 12/2011 | Habraken | 235/382 |
| 2001/0018660 A1 | 8/2001 | Sehr | |
| 2001/0045451 A1 * | 11/2001 | Tan et al. | 235/375 |
| 2002/0010640 A1 * | 1/2002 | Dutta et al. | 705/26 |
| 2002/0023955 A1 * | 2/2002 | Frank et al. | 235/382 |
| 2002/0034978 A1 | 3/2002 | Legge et al. | |
| 2002/0085762 A1 | 7/2002 | Shniberg et al. | |
| 2002/0138357 A1 * | 9/2002 | Dutta | 705/26 |
| 2002/0138751 A1 | 9/2002 | Dutta | |
| 2002/0169694 A1 * | 11/2002 | Stone et al. | 705/27 |
| 2003/0024988 A1 * | 2/2003 | Stanard | 235/462.01 |
| 2003/0153288 A1 | 8/2003 | Nakatsuyama | |
| 2003/0171960 A1 | 9/2003 | Skinner | |
| 2003/0234287 A1 | 12/2003 | Stockhammer et al. | |
| 2004/0006497 A1 * | 1/2004 | Nestor et al. | 705/5 |
| 2004/0049412 A1 | 3/2004 | Johnson | |
| 2004/0073439 A1 | 4/2004 | Shuster | |
| 2004/0093302 A1 | 5/2004 | Baker et al. | |
| 2004/0093309 A1 | 5/2004 | Nakamura et al. | |
| 2004/0199438 A1 | 10/2004 | Rowe | |
| 2006/0259445 A1 * | 11/2006 | Chatte et al. | 705/408 |
| 2010/0096452 A1 * | 4/2010 | Habraken | 235/382 |
| 2010/0241571 A1 * | 9/2010 | McDonald | 705/74 |

FOREIGN PATENT DOCUMENTS

| | | | |
|---|---|---|---|
| JP | 2001-014409 A | 1/2001 | |
| JP | 2002-024424 | 1/2002 | |
| JP | 2002-056140 A | 2/2002 | |
| JP | 2002-183612 A | 6/2002 | |
| JP | 2002-298173 A | 10/2002 | |
| JP | 2002-312813 A | 10/2002 | |
| JP | 2003-323642 A | 11/2003 | |
| JP | 2004-030063 | 1/2004 | |
| WO | WO 96/34357 | 10/1996 | |
| WO | WO 98/10361 | 3/1998 | |
| WO | WO99/60489 | 5/1998 | |
| WO | WO 99/06928 | 2/1999 | |
| WO | WO 99/60489 | 11/1999 | |
| WO | WO 99/60489 A1 * | 11/1999 | |
| WO | WO 00/52650 * | 9/2000 | |
| WO | WO 00/65514 * | 11/2000 | |
| WO | WO 00/74300 * | 12/2000 | |
| WO | WO 01/52139 A1 | 7/2001 | |
| WO | WO 01/54036 A1 * | 7/2001 | 705/26 |
| WO | WO 02/33612 A1 | 4/2002 | |

OTHER PUBLICATIONS

Anonymous, "Biometric Recognition is a Match Winner", Automatic ID News Europe, vol. 6, No. 7, Sep. 1997.*

Anonymous, "Keyware Unveils Multi-Application Smart Card Suite", Card News, vol. 16, Issue 10, May 30, 2001.*

Anonymous, "Acteva and Endspot.Com Sign Agreement to Provide On-Line Ticketing, Broader Distribution", Business Wire, Dec. 3, 1999.*

*Home page for: eventlink (www.eventpass.com); Sep. 8, 2000.

*TicketMaster Website, 1999-2000.

*Business Wire, "Acteva and Enspot.com sign agreement to provide online ticketing, broader distribution", p. 128, Dialog file 621, Access No. 02248591 Dec. 1999.

*Business Week, "Will ticketmaster get scalped? The justice dept. and rivals question its dominance", Dialog File 624, Access No. 0672094, Jan. 1995.

*Business Wire, "Tickets.com Announces Record First quarter revenues, ten-fold expansion in internet business . . .", p. 0083, Dialog File 621, Access No. 02500747, May 2000.

*Anonymous, "Online Movie Ticket Site Launched in China", China Online, Dialog File 20:Dialog Global Reporter, Dec. 23, 1999.

*Anonymous, "Biometric Recognition is a Match Winner", Automatic ID News Europe, vol. 6, No. 7, Sep. 1997.

*Anonymous, "Acteva and Enspot.Com Sign Agreement to Provide On-Line Ticketing, Broader Distribution", Business Wire, Dec. 3, 1999.

*Anonymous, Keyware Unveils Multi-Application Smart Card Suite, Card News, vol. 16, Issue 10, May 30, 2001.

International Search Report for PCT/US2005/028814, filed Aug. 12, 2005.

"Ticketing System Uses Internet Technology to Reduce Unused Seats While Combating Scalpers and Brokers", *Marketing Report*, 11(11), 2 pages (Aug. 1999).

Collection of News Article Reports (1999).

American Airlines, "Rules for American Airlines' Silent Auction".

American Airlines, Latest American Airlines Internet Silent Auction Says, "Bring Along Your Friends" Released: Aug. 8, 1996.

American Airlines, "Internet Silent Auction, Items for Silent Auction.".

American Airlines, "Internet Silent Auction Room, Two Coach Class Roundtrip Tickets to one of Nine Selected Destinations".

"Acteva and Enspot.com sign agreement to provide on-line ticketing, broader distribution" Business Wire. Dec. 2, 1999.

Alba, J., et al., "Interactive Home Shopping: Consumer, Retailer, and Manufacturer Incentives to Participate in Electronic Marketplaces," *J. of Marketing*, 61: 38-53 (Jul. 1997).

Armstrong, A., et al., "The Real Value of On-Line Communities," *Harvard Business Review*, pp. 134-141 (May-Jun. 1996).

Asokan, N. et al., "Secure Electronic MarketPlace for Europe, SEMPER" IBM Research, Zurich, (1999).

Cox, B., "Lufthansa Launches Air Fare Auction Promo," [online], Feb. 23, 1999 [Retrieved on Feb. 20, 2008], Retrieved from the Internet URL: http://www.internetnews.com/ec-news/article.php/72061.

Deighton, J., "The Future of Interactive Marketing," *Harvard Business Review*, pp. 4-16 (Nov.-Dec. 1996).

"EBay," Wikipedia, [online] [Retrieved on Oct. 23, 2008], Retrieved from the Internet URL: http://en.wikipedia.org/wili/Ebay.

"Egghead.com/OnSale.com—About Us." [online] [Retrieved on Oct. 7, 2008], Retrieved from the Internet URL: http://web.archive.org/web/19991129022730/www.onsale.com/helpinfo.firsttime/about.h. . . .

Foster, C., "It's All in the Cards: Four student entrepreneurs have built a better season ticket," *Stanford Magazine: Bright Ideas*, May/Jun. 2000, [online], [Retrieved on May 20, 2008], Retrieved from the Internet URL: http://www.stanfordalumni.org/news/magazine/2000/mayjun/departments/brightideas.html.

Fujimura, K., et al., "Digital-Ticket—Controlled Digital Ticket Circulation," *Proceeding of the 8th USENIX Security Symposium*, Aug. 23-26, 1999.

Garcia, D. L., "Networked Commerce: Public Policy Issues in a Deregulated Communication Environment," *The Information Society*, 13: 17-31 (1997).

Gogan, J. L., "The Web's Impact on Selling Techniques: Historical Perspective and Early Observations," *Intl. J. of Electronic Commerce*, 1(2): 89-108 (1996-1997, Winter).

Harvard University Dining Services—Crimson Cash, [online] [Retrieved on Feb. 20, 2000] Retrieved from the Internet URL: http://web.archive.org/web/19990424112706/www.dining.harvard.edu/crimson_cash.html.

Henderson, J., "That's the (Internet) ticket, Ex-Prosecutors Develop Electronic Turnstile System," Palm Beach Daily News, 103(264): 22, (Aug. 1, 1999).

Himelstein, L., "Will Ticketmaster get scalped?: The justice dept. and rivals question its dominance." Business Week, No. 3430: 64+, (Jun. 26, 1995).

Hoffman, D. L., et al., "Commercial Scenarios for the Web: Opportunities and Challenges," Retrieved from the Internet URL: http://jcmc.indiana.edu/vol1/issue3/hoffman.html. [Retrieved on Feb. 27, 2008].

Hoffman, D. L., et al., "Marketing in Hypermedia Computer-Mediated Environments: Conceptual Foundations," *J. of Marketing*, 60: 50-68 (Jul. 1996).

Jarvenpaa, S. L., et al., "Consumer Reactions to Electronic Shopping on the World Wide Web," *Intl. J. of Electronic Commerce*, 1(2): 59-88 (1996-1997, Winter).

Kaliniak, C., "Spring Technologies and Jhoon Rhee Tae Kwon Do Launch New Technology that Enhances Customer Service," [online], [Retrieved on Feb. 20, 2008], Retrieved from the Internet URL: http://web.archive.org/web/20010210040224/www.eyeticket.com/company/press-room. . . (Apr. 1999).

Kaliniak, C., "SportScan Provides High Tech Solution to Enhancing Jhoon Rhee Tae Kwon Do Customer Experience," [online], Jun. 1999 [Retrieved on Feb. 20, 2008], Retrieved from the Internet URL: http://web.archive.org/web/20010415014244/www.eyeticket.com/company/press-room. . . .

Kopf, J.H., "Product Design, Justarrive Entrance Unit v.3—Electronic Fulfillment System.".

Lee, H. G., et al., "Impacts of the Electronic Marketplace on Transaction Cost and Market Structure," *Intl. J. of Electronic Commerce*, 1(1): 127-149 (1996, Fall).

Lucking-Reiley, D., "Auctions on the Internet: What's Being Auctioned, and How?" *Department of Economics, Vanderbilt University*, Aug. 14, 1999.

Lufthansa USA: Welcome to Lufthansa, [online], [Retrieved on Feb. 21, 2008], Retrieved from the Internet URL: http://web.archive.org/web/19990222101713/http://www.lufthansa-usa.com/.

Martin, D., "No Tickets Required," *Travel Agent*, 275(6): 28+, (May 8, 1995).

Matsuyama, K., et al., "Distributed Digital-Ticket Management for Rights Trading System", Association for Computing Machinery, Proceedings of the 1st ACM Conference on Electronic Commerce, E-Commerce 99, 110-118, (1999).

Moran, S., "Going . . . Going . . . Downloaded," *Information Processing*.

Neo, B. S., "The Implementation of an Electronic Market for Pig Trading In Singapore," *J. of Strategic Information Systems*, 1(5): 278-288 (Dec. 1992).

Quelch, J. A., et al., "The Internet and International Marketing," *Sloan Management Review*, pp. 60-75 (1996, Spring).

Reck, M., "Types of Electronic Auctions," *Information and Communications Technologies in Tourism*, Proceedings of the Intl. Conf. in Innsbruck, Austria (1994).

San Diego State University, Graduate Bulletin 1996-1997, pp. 1-11, [online] [Retrieved on May 20, 2000] Retrieved from the Internet URL: http://web.archive.org/web/20000609-19960101re_/http://coursecat.sdsu.edu/GB9697/SF. . . .

Tankersley, J., "Basketball Ticket Plan Unveiled," The Stanford Daily, An Independent Newspaper, 216(18), (Oct. 13, 1999).

"Tickets.com Announces Record First Quarter Revenues; Ten-Fold Expansion in Internet Business . . . " Business Wire, (May 15, 2000).

"Tickets.com", Prospectus Summary, Nov. 3, 1999.

TicketMaster Website, [online] [Retrieved on Aug. 24, 2000] Retrieved from the Internet URL: https//ticketing.ticketmaster.com/cgi/p. . .nt_idF003076E064E7&event_code=EEQ0825.

Tjøstheim, I., et al., "A case study of an on-line auction for the World Wide Web," [online] [Retrieved on Feb. 20, 2008], Retrieved from the Internet URL: http://www.nr.no/~ingvar/enter98.html.

Wigand, R. T., "Electronic Commerce: Definition, Theory, and Context," *The Information Society*, 13: 1-16 (1997).

Wigand, R. T., et al.,"Electronic Commerce: Effects on Electronic , Markets," *J. of Computer-Mediated Communication*, 1(3), Retrieved from the Internet URL: http://jcmc.indiana.edu/vol1/issue3/wigand.html. [Retrieved Feb. 27, 2008].

"University of Texas—General Information 1996-1997, Registration, Fees, Deposits," pp. 1-8, [Retrieved on Feb. 20, 2008], Retrieved from the Internet URL: http://www.utexas.edu/student/registrar/catalogs/gen-info/fees5.html.

Zwass, V., "Electronic Commerce: Structures and Issues," *Intl. J. of Electronic Commerce*, 1(1): 3-23 (1996, Fall).

"Online Movie Ticket Site Launched in China." WCON, (Dec. 23, 1999).

"Biometric Recognition is a Match Winner." News Europe, 6(7), (Sep. 15, 1997).

"Keyware Unveils Multi-Application Smart Card Suite." Card News, 16(10), May 30, 2001.

Home Page for Eventlink (www.eventpass.com) [online] [Retrieved on Sep. 8, 2000] Retrieved from the internet URL: http://www.eventpass.com/.

Memorandum, "The Just@rrive Men's Basketball Solution," Just@rrive, Inc., (Aug. 2, 1999).

"Justarrive Business Proposal and Demonstration," Justarrive, Inc., Stanford University (Oct. 11, 1999).

Brochure, Justarrive, Inc. Aug. 1999.

Brochure, "Justarrive & Stanford Athletics—A Powerful Combination," Justarrive, Inc., pp. 1-4.

Justarrive, Inc., "The Justarrived Platform: Integrated Entrance," Dated, May 21, 2008.

Justarrive, Inc., "Hardware,", Dated, May 21, 2008.

"Justarrive Redefines College Sports Marketing Rewarding Both Fans and Teams Alike," *Business Wire*, Nov. 10, 2000.

Bases Job Postings Apr. 17, 2000, The Source for Start-up Jobs, Published Weekly, http://bases.stanford.edu/job_postings_db/, Justarrive, Inc.

Flash Seats Complaint to Paciolan, Inc., United States District Court for the District of Delaware, pp. 1-4.

Paciolan's Answer and Counterclaims, *Flash Seats LLC v. Paciolan, Inc.*, United States District Court for the District of Delaware, Civil Action No. 07-575 (JJF), pp. 1-8.

Flash Seats' Reply to Counterclaims of Paciolan, United States District Court for the District of Delaware, Civil Action No. 07-575 (JJF), pp. 1-4.

Plaintiff Flash Seats, LLC's Opening *Markman* Brief, United States District Court for the District of Delaware, Civil Action No. 07-575 (JJF), pp. 1-33.

Declaration of Maria L. Cedroni, Esq., in Support of Plaintiff Flash Seats, LLC's Opening *Markman* Brief, including Exhibits A-O, United States District Court for the District of Delaware, Civil Action No. 07-575 (JJF).

Declaration of Steven R. Kursh, Ph.D., CSDP, in Support of Plaintiff Flash Seats, LLC's Opening *Markman* Brief, including Exhibits 1-4, United States District Court for the District of Delaware, Civil Action No. 07-575 (JJF).

Paciolan's Opening Claim Construction Brief, United States District Court for the District of Delaware, Civil Action No. 07-575 (JJF), Jun. 2008.

Declaration of Benjamin B. Au in Support of Paciolan's Brief on Claim Construction, including Exhibits A-Y, United States District Court for the District of Delaware, Civil Action No. 07-575 (JJF).

Flash Seats, LLC's Answer to Paciolan's Opening Claim Construction Brief, United States District Court for the District of Delaware, Civil Action No. 07-575 (JJF), Jul. 2008.

Declaration of Steven R. Kursh, Ph.D., CSDP in Support of Flash Seats, LLC's Answer to Paciolan's Opening Claim Construction Brief, including Exhibits 5-8, United States District Court for the District of Delaware, Civil Action No. 07-575 (JJF).

Paciolan, Inc.'s, Answering Claim Construction Brief, United States District Court for the District of Delaware, Civil Action No. 07-575 (JJF), Jul. 2008.

Declaration of Benjamin B. Au in Support of Paciolan Inc.'s Reply to Flash Seats, LLC's Claim Construction Brief, United States District Court for the District of Delaware, Civil Action No. 07-575 (JJF).

Declaration of Vernon Thomas Rhyne, Ph.D. P.E., R.P.A., in Support of Paciolan's Answering Claim Construction Brief, United States District Court for the District of Delaware, Civil Action No. 07-575 (JJF), pp. 1-14.

Letter to District Court forwarding Supplemental Declaration of Benjamin D. Au, including Exhibit A, United States District Court for the District of Delaware, Civil Action No. 07-575 (JJF), Jul. 2008.

Declaration of Maria L. Cedroni, Esq. in Support of Supplemental Submission for Markman Hearing, United States District Court for the District of Delaware, Civil Action No. 07-575 (JJF), forwarded to District Court in letter dated Jul. 30, 2008.

Transcript of Markman Hearing Before the Honorable Joseph J. Farnan United States District Judge, United States District Court for the District of Delaware, Civil Action No. 07-575 (JJF), Jul. 22, 2008.

Second Stipulated Order Staying Case (*Flash Seats, LLC* v. *Paciolan, Inc.*) United States District Court for the District of Delaware, Civil Action No. 07-575 (JJF).

Declaration of Maria L. Cedroni, Esq. in Support of Plaintiff Flash Seats, LLC's Answering Brief, including Exhibits P-R, United States District Court for the District of Delaware, Civil Action No. 07-575 (JJF), Jul. 11, 2008.

\* cited by examiner

ELECTRONIC TICKETING SYSTEM AND METHOD

RELATED APPLICATIONS

The present application is a continuation application and claims the benefit of U.S. patent application: "Electronic Ticketing System And Method," Ser. No. 09/590,455, filed Jun. 9, 2000 now U.S. Pat. No. 6,496,809, and is herein incorporated by reference.

TECHNICAL FIELD

The present invention relates to a system and method for real-time sales and distribution of tickets.

BACKGROUND OF THE INVENTION

Paper tickets are widely used to grant access to patrons to sporting and general entertainment events. The ticket is a contract which grants the holder the right to attend the event and, normally, to sit in a particular seat. By transferring possession of the physical ticket, a ticket holder has transferred the right to attend the event.

However, many problems are associated with the transfer of paper tickets. In order to issue the ticket, the event promoter must organize the delivery of thousands of tickets. Additionally, if a purchaser wishes to transfer the ticket to a subsequent purchaser, the buyer and seller must be geographically proximate to physically transfer the ticket. With the advent of the Internet, buyers and seller have been able to locate each other in order to transfer tickets. However, the paper ticket still stands as an impediment to the efficient transfer of the right to attend an event because the seller must ship the ticket to the seller. By shipping the ticket the buyer and seller incur additional costs and require a greater lead time to allow the transfer to occur before the event. Each party must also have enough trust that the other party will deliver as agreed. Frequently, because of the impediments of sale, tickets are not widely transferred by geographically remote buyers and sellers.

Another type of impediment stands in the way of the efficient transfer of tickets. Most states have laws which prevent the sale of tickets for more than the face value of the ticket unless the seller has the consent of the event sponsor. To sell the ticket above face value, it is impractical for an individual seller to attempt to obtain permission from an event sponsor prior to selling a ticket. Because an event sponsor makes no money on the transaction, it has very little incentive to grant consent.

In a few other states laws allow a ticket broker to sell tickets at a price above the face value of the ticket, but not buy tickets above face value. Therefore, ticket brokers must obtain a ticket at the face value from the event sponsor and resell the ticket at a higher price. The ticket broker is violating the law if he purchases the ticket at a higher value from someone who is not a ticket broker. Finally, the ticker broker must still physically transfer the ticket to the buyer.

The present invention is a system and method which provides a legal, efficient way to transfer the right to attend an event at the market value of that right and to determine the market value. The present invention eliminates the disadvantages of the prior art.

SUMMARY OF THE INVENTION

The present disclosure provides a method of electronically exchanging tickets for an event in a secondary market from ticket sellers to ticket buyers located at remote terminals. The method comprises associating the tickets with authentication data of the ticket seller, receiving from ticket sellers electronic asks comprising an ask quantity and an ask price, receiving from a ticket buyer an electronic bid comprising a bid quantity and a bid price, comparing the bid to the asks, completing a transfer of the tickets when the bid price equals the ask price and the ask quantity is equal to or greater than the bid quantity, and reassociating the tickets with authentication data of the ticket buyer. Also disclosed is a system for performing the method.

DETAILED DESCRIPTION OF THE PREFERRED EMBODIMENT

Figure 1:
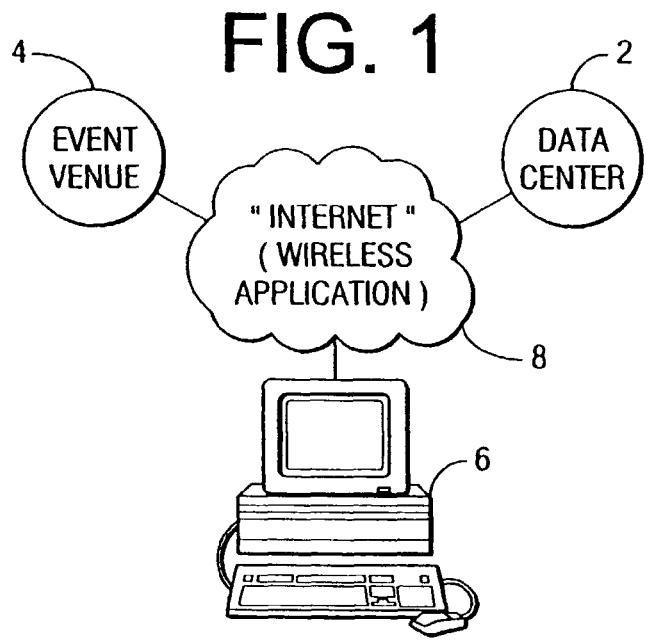
FIG. 1 is a diagram of the system according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, the system architecture of the preferred embodiment of the present invention is implemented in three types of locations: a data center 2, a plurality of venues 4, and a plurality of terminals 6. The data center 2 is in communication with each venue 4 and each terminal 6 through the Internet or any Wireless Application 8. The terminals 6 can be any device through which a user can access a website, for example: a personal computer, a personal digital assistant, an Internet-through-television device, or any type of many available wireless devices available in the market.

Figure 2:
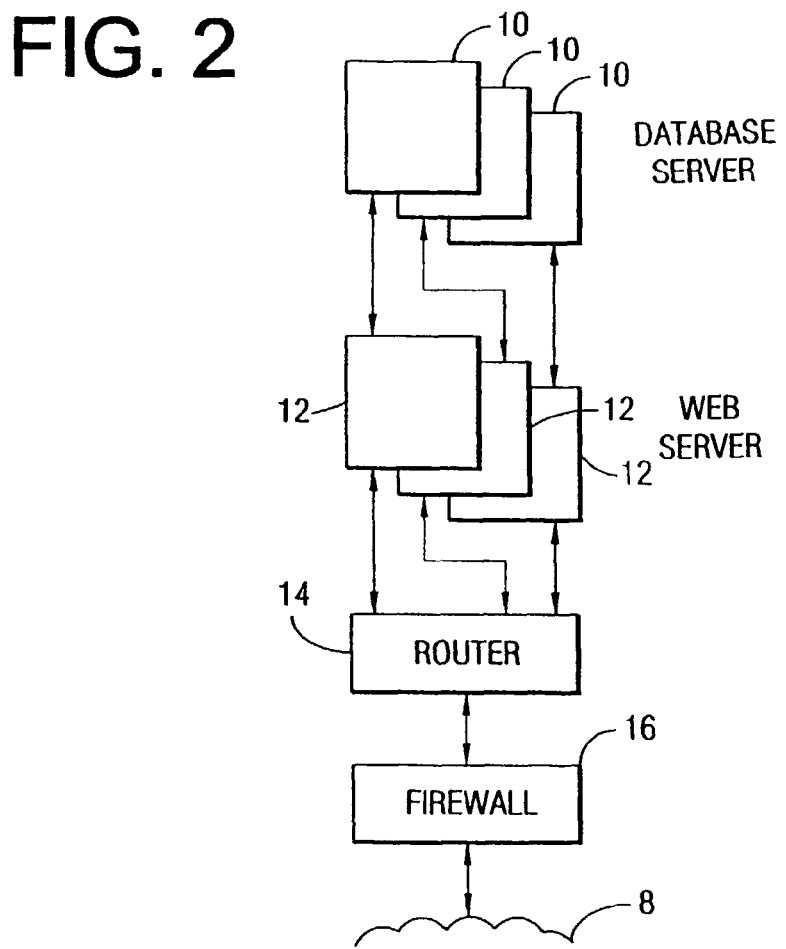
FIG. 2 is a diagram of a data center according to an embodiment of the present invention.

Referring to FIG. 2, the data center 2 preferably comprises database servers 10, web servers 12, a load balancing router 14 and a firewall 16 connected to the Internet 8. The firewall 15 receives messages from the Internet 8 and forwards the messages to the load balancing router 14 and likewise receives messages from the load balancing router 14 and forwards them to the Internet 8. The firewall 16 preferably performs a number of filtering functions and network address translation in order to safeguard the data center 2 from unauthorized access. The firewall 16 also preferably encrypts the messages using known public key/private key encryption methods. The load balancing router 14 forwards messages received from the firewall 16 and forwards the messages to one of the plurality of web servers 12. The load balancing router 14 also forwards messages received from the web servers 12 to the firewall 16. In this manner, the load balancing router 14 distributes tasks to be performed to one of the plurality of web servers 12 in order to distribute processing demands. The web servers 12 access the database servers 10 to retrieve and store information in response to received messages from the terminals 6 and transmits reply messages to the terminals 6. The database servers 10 store data tables which contain information about various venues, events, ticket resources, user roles, ticket status, ticket holders and ticket bidders, as will be explained in greater detail below.

Figure 3:
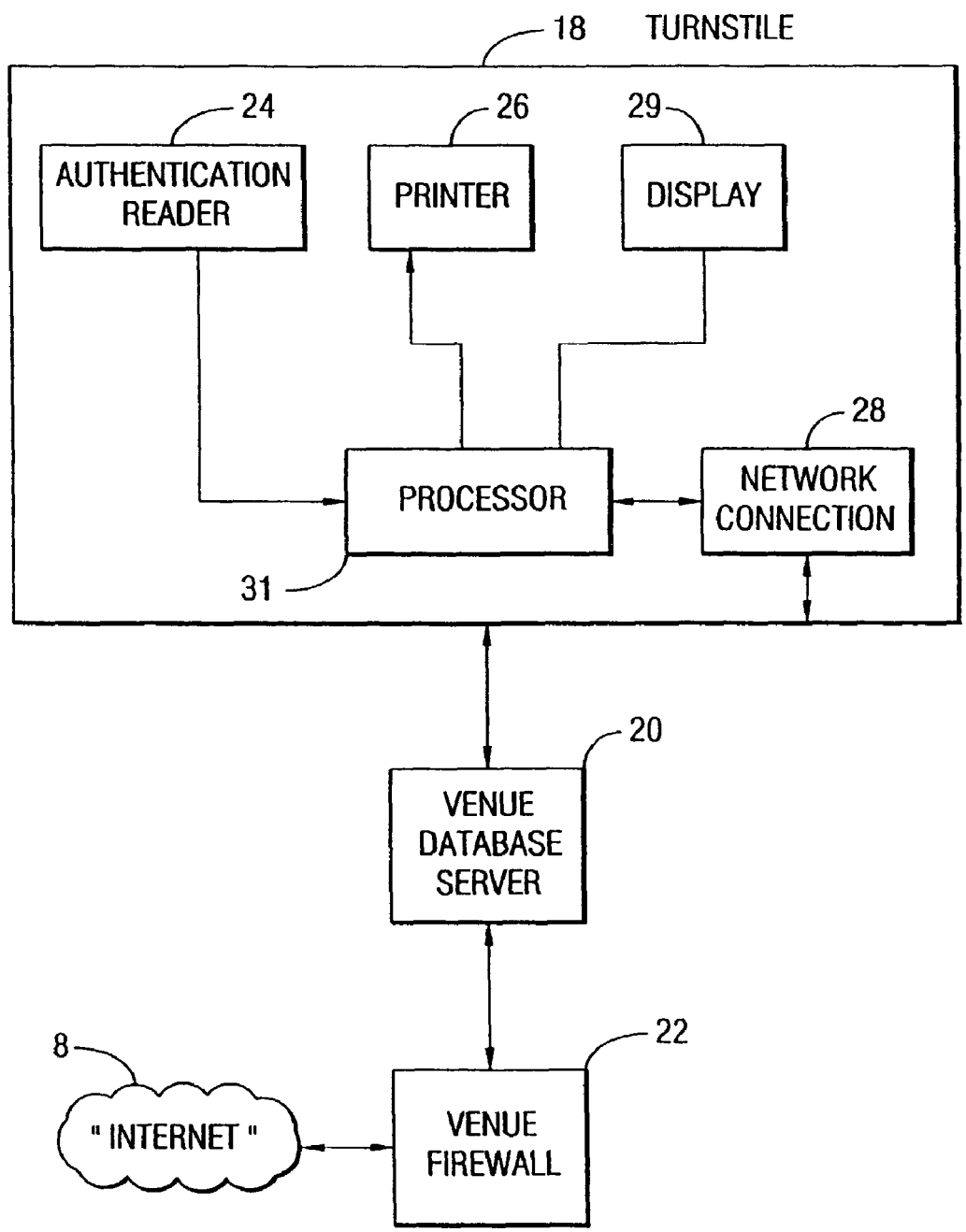
FIG. 3 is a diagram of a venue according to an embodiment of the present invention.

Referring to FIG. 3, within each venue 4 are a plurality of turnstiles 18, a venue database server 20 and venue firewall 22 connected to the Internet 8 for communicating to the data center 2. The turnstile 18 of the venue 4 comprises an authentication reader 24, a printer 26, a network connection 28, a display 29 and a processor 31. The authentication reader 24 is preferably a magnetic card reader. However, other types of cards may be used, such as cards incorporating single- or multi-dimensional bar codes or wireless methods of communication, without departing from the scope of the present invention. The network connection 28 allows the turnstile 18 to communicate with the venue database server 20 in order to provide information about the card being scanned and to receive information about whether to grant or deny entry to the venue 4. The turnstile 18 preferably is a compact unit which runs from embedded software within the turnstile or from a server located on site or remotely 18. While the turnstile 18 is described as being connected with the venue database server 20 with a wire, one of ordinary skill in the art can easily recognize that communication between the turnstile and database server can be implemented by radio frequency, optical communication or any other method of wireless communication without departing from the scope of the present invention. The venue database server 20 maintains a record of the tickets which have been sold, the ticketholders which have passed through the turnstile 18 and which ticketholders have not yet arrived. The database server is preferably a computer running UNIX, Windows NT, Java or Sparc and having an Oracle, Informix, Sysbase or SQL Server database.

In order to implement the present invention, an end user can access the data center 2 by using a standard web browser on the terminal 6. However, non-standard, custom software can also be implemented or web browser software on a wireless device, such as a personal digital assistant. Terminals 6 can log into the data center 2 to view events which will take place in the future, purchase tickets in the primary market from the event sponsor, offer tickets for sale in the secondary market, purchase tickets in the secondary market and purchase merchandise or services related to the event. When the user has entered the appropriate address of a desired data center 2, e.g., an on-line ticketing web page, the user can view a calendar of events to search for a desired event or choose a venue to see what events will be appearing at the venue in the future. After selecting an event which the user desires to attend, the user may purchase tickets for the event from the event sponsor. Additional products and services can also be offered at the time of ticket sales. After the ticket is sold and before the time of the event, the ticket can be transferred by the ticket owner to subsequent ticket buyer.

Figure 4:
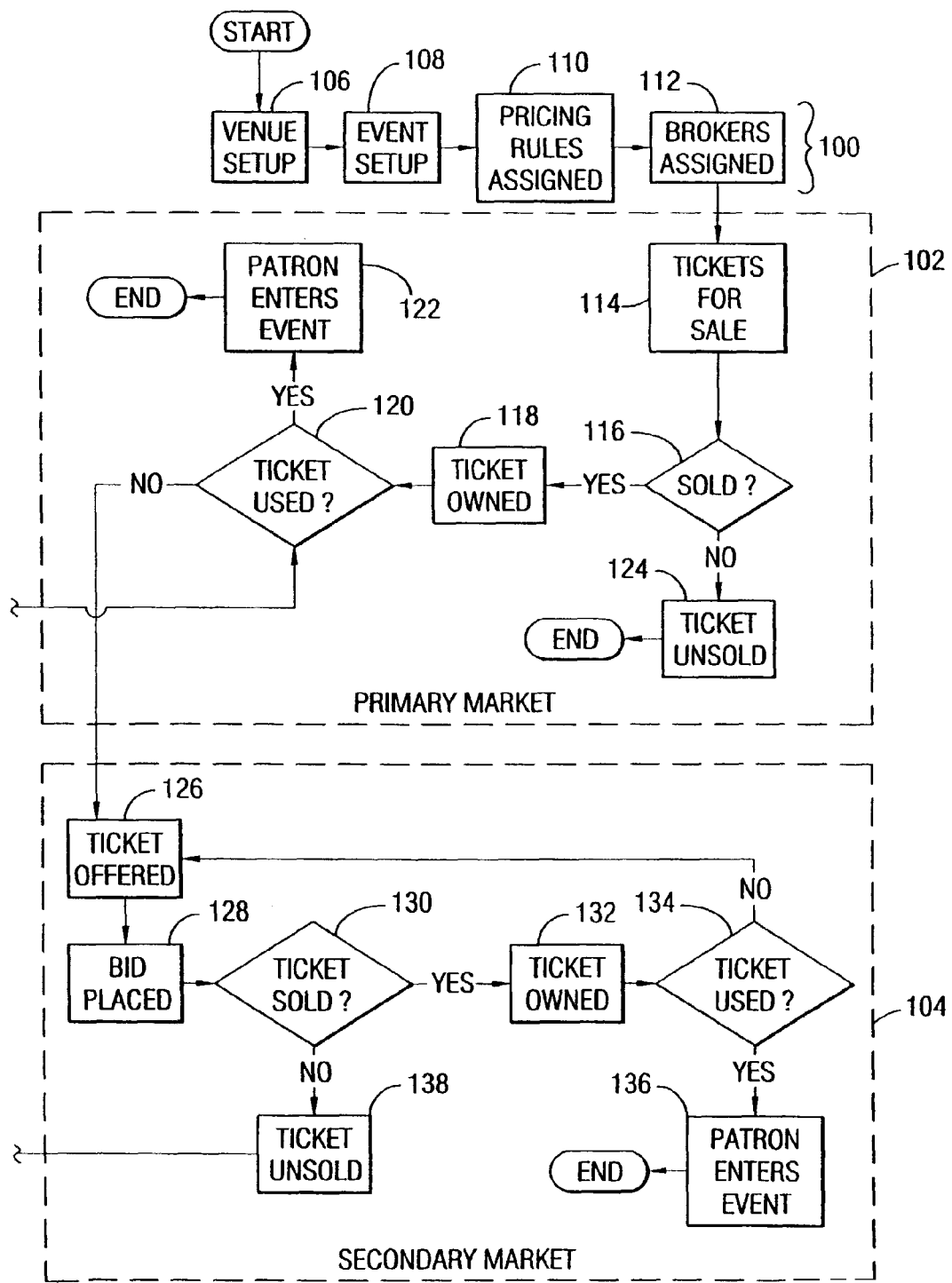
FIG. 4 is a flow chart describing the steps of an embodiment of the present invention.

Referring to FIG. 4, the ticket has a determined life cycle which is tracked by the system of the present invention. The steps of the life cycle are: ticket setup 100, primary market 102 and secondary market 104. In the ticket setup step the ticket is assigned a venue 106, an event 108 and ticket pricing rules 110 are associated with the ticket. Additionally, brokers may be assigned to the ticket 112 in order to transfer the ticket in a multi-broker environment. In the primary market step 114 the ticket is offered for sale. If the ticket is sold 116, the ticket becomes an "owned ticket" 118. If the ticket is used 120 by the person it is sold to, the patron is allowed to enter the event 122 and the tickets life cycle ends in the primary market. If the ticket is not sold before the time of the event 124, the ticket's life cycle ends having been unsold in the primary market.

If the ticket is not used in the primary market, it may be traded in the secondary market 126. There is no limit how many times the ticket may be traded in the secondary market before the time of event. Many options are available for sales of tickets in the primary and secondary market. Sales of tickets can be made using traditional methods, such as by offering a ticket for a fixed price or a scaled price (i.e. student and senior citizen discounts). Tickets can also be offered using a non-traditional format such as in an auction-type format, a reverse auction-type format or in an exchange-type format. In an auction-type format, event sponsors can place groups of tickets on sale and sell them to highest bidder after a fixed period of time. Many different options are available for the auction-type format, such as allowing users to place bids for groups of tickets. If the user's bid cannot be satisfied at the present price for all seats, the bid fails. Alternatively users can place a bid for which, if the bid cannot be fulfilled for the quantity of seats of the bid, the number of seats in the bid is reduced. {Any other variations which can be considered}. Using the auction type format, the event sponsor realizes the maximum profit for the event because tickets are sold for their true market value. A reverse auction type format is similar to an auction-type format with the caveat that the event sponsor "bids" to sell the ticket rather than users bidding for the right to buy the ticket.

In an exchange type format, tickets are sold in the primary market by event sponsors who advertise an ask price for a particular ticket. At the same time, users advertise a bid price in order to purchase a particular ticket in a particular section of the venue. Both the ask price and the bid price remain valid for a particular period of time. If the ask price advertised by event sponsors is higher than the bid price advertised by any particular user, no ticket is sold. However, the moment a bid price equals an ask price, a sale of a ticket is made. Additionally, bids can specify quantities of contiguous seats as well as a bid price. In a like manner, event sponsors can specify quantities of contiguous seats along with the ask price. An event sponsor may wish to specify a minimum number of contiguous tickets to prevent large blocks of seats from being broken up or to force the sale of an exact number of number of seats in order to prevent a single seat in a block from block from being unsold (i.e. to prevent selling two seats of a block of three unsold seats). An event sponsor may wish to specify a maximum number of seats in order to prevent. When a user's bid price equals and quantity of seats for an event equals a sponsor's ask price and is within the sponsor's minimum and maximum quantity of seats, a sale is made. Therefore, the main difference between an auction type format or a reverse auction-type format is that sales are made instantaneously when a bid price equals an ask price for a ticket.

Alternatively, for different classes of seating at the venue, a combination of sales formats can be implemented. For example, for a sporting event, seats which have the best view, such as box seats and luxury boxes, an event sponsor can implement a non-traditional format which seeks to secure the highest market price and implement a traditional format of ticket sales for the remaining seats. Also, tickets may be sold in the primary market by a particular method and sold in the secondary market by another method. Tickets may also be sold in the primary market by one method and sold in the secondary market by one of multiple available methods.

During the step of offering the ticket 126, a price is associated with the ticket. Depending on the format the price has a different significance. For example, the price may be a first bid price or, in an exchange type format, the price may be an ask price. Next bids are placed on the ticket 128 until the ticket is sold 130. If the ticket is sold the ticket is now owned by the new buyer 132 who may use the ticket and enter the event 136 or offer the ticket for resale 126. If the ticket remains unsold 138, the ticket may be used in the primary market 102. Additionally, unsolicited bids can be placed for a ticket. Anyone seeking to buy a ticket can specify the price at which he or she is willing to buy and wait to see if a ticket owner is willing to sell at that price.

Each time a ticket is transferred new ownership information is associated with the ticket. Ownership information could be credit card numbers used to purchase the ticket, a cell phone number, a digital encryption on a personal digital assistant, or a single- or multi-dimensional bar code. The two dimensional bar code can be printed by the user in order to provide a physical indication of ticket ownership. In order to provide an incentive for event sponsors to grant permission to sell the tickets in the secondary market, the present system provides that for sales in the secondary market the event sponsor will receive a royalty. Royalties can be a flat fee or a fee based on the sales price of the ticket in the secondary market.

Thus, data center 2 (e.g., as a tracking means) associates the paperless tickets with authentication data of a ticket seller, the data center 2 (e.g., as a computer means) further being adapted to complete a transfer of the paperless tickets; reassociate the paperless tickets with authentication data of the ticket buyer, and allows access to the venue upon presentation of the buyer authentication data to an access device operably connected for communication with the data center 2.

Thus, the data center 2 associates the paperless tickets with authentication data of a ticket seller. The data center 2 is further adapted to receive from ticket sellers electronic asks comprising an ask quantity and an ask price, and to receive from a ticket buyer an electronic bid comprising a bid quantity and a bid price. The data center 2 may then compare the bid to the asks and complete a transfer of the paperless tickets when the bid price equals the ask price and the ask quantity is equal to or greater than the bid quantity. The data center 2 may also reassociate the paperless tickets with authentication data of the ticket buyer, and allow access to the venue upon presentation of the buyer authentication data to an access device operably connected to the data center 2.

Figure 5:
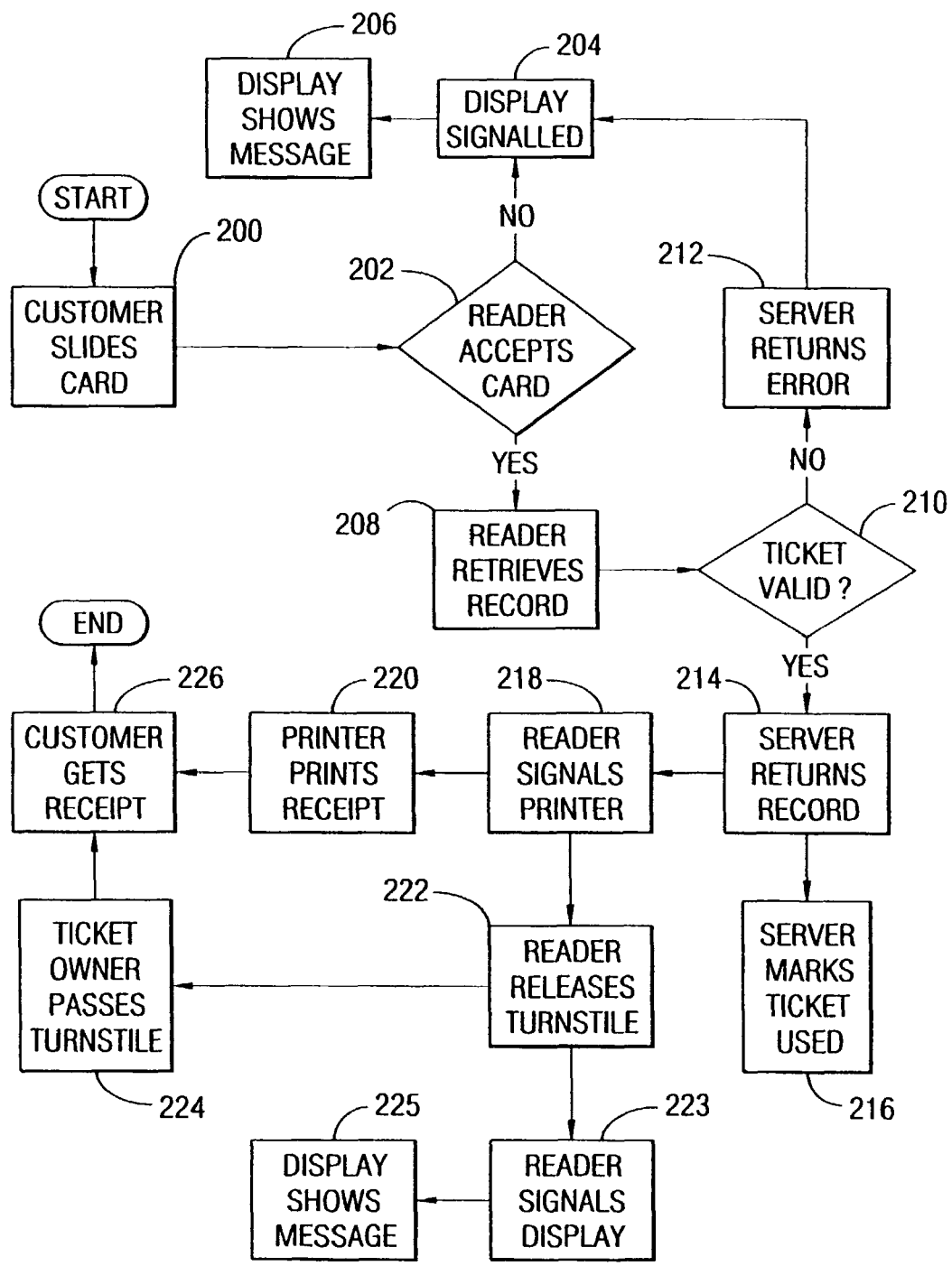
FIG. 5 is a flow chart describing the steps of an embodiment of the present invention.

Referring to FIG. 5, upon arriving at the venue to attend an event, the ticket owner authenticates himself to the event sponsor in order to gain entry to the venue. Authentication can occur in a variety of ways including infra-red wireless scanning. In one example, the ticket owner slides the credit card 200 associated with the ticket through the authentication reader 24 on a turnstile 18. Alternative methods for authentication could be implemented such as bar coded authentication tickets, as described above. If the authentication reader 24 unsuccessfully scans the authentication 202, the reader signals the display 204 to indicate that the authentication was not successfully scanned 206. If the authentication is successfully scanned, the reader queries the venue database server 20 to determine whether the ticket is valid 210. If the ticket is not valid, the venue database server 20 returns an error 212 and the display is signaled 204 and message displayed 206. If the ticket is valid, the venue database server 20 returns a message indicating the ticket is valid 214.

Next, the venue database server 20 marks the ticket as used 216 within the database and signals the printer 26 to print a receipt 216 and the printer responds by printing a receipt 218. The authentication reader 24 also releases the turnstile 18 (step 222) and signals the display 223 which displays a message 225. Next, the ticket owner passes through the turnstile 224 to allow the ticket owner to enter the venue 4.

In order to implement the present system, user roles are implemented, such as: venue management, event management, event marketing, ticket owner, ticket buyer and administration. The roles may interact with the system in order to fulfill necessary tasks by either using terminals 6 connected via the Internet 8 or directly to the data center 2 or venue 4. A user fulfilling a venue management role can enter information regarding the venue such as seating charts, directions to the venue and entrance gate information. A user fulfilling an event management role can enter information about an event to take place at the venue, such as the name, time, date, seating configuration of the venue, ticket pricing for the event and merchandise to be offered to ticket purchasers. A user fulfilling an event marketing role can enter information pertaining to products and services that are offered to users upon offer or completion of a ticket sale. A user fulfilling the role of a ticket owner can enter information regarding the price (first auction bid or ask price, as appropriate) and identity of the ticket or tickets. A user fulfilling the role of ticket buyer can enter information regarding the quantity and price (an "auction bid" price or an "exchange bid," as appropriate). A user fulfilling the role of administrator preferably has the rights of all roles and any additional task necessary for maintenance of the system.

While the specific embodiments have been illustrated and described, numerous modifications come to mind without significantly departing from the spirit of the invention and the scope of protection is only limited by the scope of the accompanying claims.

What is claimed:

1. A method for providing access to an event after a paperless ticket exchange, the method comprising:
  (a) in a ticketing system:
  tracking a life cycle of an electronic ticket, the life cycle including any combination of: electronic ticket setup, sale of the electronic ticket to a ticket owner but not used by the ticket owner, resale of the electronic ticket by the ticket owner to a subsequent ticket buyer, and trade of the electronic ticket by subsequent ticket buyers, each of the ticket owner and each subsequent ticket buyer being a respective ticket holder;
  transferring ownership of the electronic ticket from one ticket holder to a subsequent ticket holder; said transferring including allowing multiple changes in ownership of the electronic ticket as traded throughout the life cycle of the electronic ticket from setup through multiple transfers in ownership;
  creating and electronically storing in the ticketing system an ownership record for the electronic ticket, the ownership record including ownership information identifying and authenticating a current ticket holder, the ownership record associating new respective ownership information each time ownership of the electronic ticket is transferred, and the ownership record indicating the tracked life cycle of the electronic ticket from ticket setup through multiple transfers of ownership of the electronic ticket, wherein ticket setup is before the sale of the electronic ticket to the ticket owner, and wherein the ownership information is a credit card number, as provided by a respective ticket holder to the ticketing system, the credit card number alone identifying and authenticating the respective ticket holder as the current ticket holder; and
  (b) authorizing access to the event by (i) receiving, at a venue access point of the ticketing system, an instance of the ownership information identifying and authenticating the current ticket holder, the received instance being the credit card number as provided by the current ticket holder and thus free of use of a number specific to the ticketing system and by (ii) successfully comparing the received instance of the ownership information to the ownership information stored in the ownership record, the comparing being of the credit card number as provided by the current ticket holder and thus free of use of a number specific to the ticketing system.

2. The method of claim 1, wherein the received instance of the ownership information identifying and authenticating the current ticket holder comprises ownership information identifying the current ticket holder that is not specific to the particular event.

3. A computer system for providing access to an event through a paperless ticket exchange, the system comprising:
  a data center programmed to:
    track a life cycle of an electronic ticket, the life cycle including any combination of: electronic ticket setup, sale of the electronic ticket to a ticket owner but not used by the ticket owner, resale of the electronic ticket by the ticket owner to a subsequent ticket buyer, and trade of the electronic ticket by subsequent ticket buyers, each of the ticket owner and each subsequent ticket buyer being a respective ticket holder;
    transfer ownership of the electronic ticket from one ticket holder to a subsequent ticket holder; said transfer including allowing multiple changes in ownership of the electronic ticket as traded throughout the life cycle of the electronic ticket from setup through multiple transfers in ownership;
    create and electronically store an ownership record of a ticketing system of the electronic ticket to an event;
    electronically update the ownership record for the electronic ticket upon each occurrence of a transfer event transferring ownership of the electronic ticket from one ticket holder to a subsequent ticket holder, wherein said data center updates the ownership record with ownership information that identifies and authenticates a current ticket holder, such that the ownership record associates new respective ownership information each time ownership of the electronic ticket is transferred and the ownership record indicates the tracked life cycle of the electronic ticket from ticket setup through multiple transfers of ownership of the electronic ticket, wherein ticket setup is from a time period before the sale of the electronic ticket to the ticket owner, and wherein the ownership information is a credit card number or a cell phone number as provided by a respective ticket holder to the ticketing system, the data center programmed to use said credit card number or cell phone number alone and as provided by the respective ticket holder, to identify and authenticate the respective ticket holder as the current ticket holder; and
  an access device connected to communicate with the data center, the access device programmed to grant access to the event based solely upon an instance of the ownership information received at the event, including the access device being programmed to compare the received instance of the ownership information to the ownership information stored in the ownership record, such that the data center and the access device use the credit card number or the cell phone number as provided by the current ticket holder and free of use of a number specific to the ticketing system.

4. The system of claim 3, wherein the received instance of the ownership information comprises ownership information that identifies the current ticket holder and that is not specific to the particular event.

5. A method for providing access to an event after a paperless ticket exchange, the method comprising:
  (a) in a ticketing system:
    tracking a life cycle of an electronic ticket, the life cycle including any combination of: electronic ticket setup, sale of the electronic ticket to a ticket owner but not used by the ticket owner, resale of the electronic ticket by the ticket owner to a subsequent ticket buyer, and trade of the electronic ticket by subsequent ticket buyers, each of the ticket owner and each subsequent ticket buyer being a respective ticket holder;
    transferring ownership of the electronic ticket from one ticket holder to a subsequent ticket holder; said transferring including allowing multiple changes in ownership of the electronic ticket as traded throughout the life cycle of the electronic ticket from setup through multiple transfers in ownership;
    creating and electronically storing in the ticketing system an ownership record for the electronic ticket, the ownership record including ownership information identifying and authenticating a current ticket holder, the ownership record associating new respective ownership information each time ownership of the electronic ticket is transferred, and the ownership record indicating the tracked life cycle of the electronic ticket from ticket setup through multiple transfers of ownership of the electronic ticket, wherein ticket setup is before the sale of the electronic ticket to the ticket owner, and wherein the ownership information is a cell phone number provided by a respective ticket holder to the ticketing system, the cell phone number as provided by the respective ticket holder identifying and authenticating the respective ticket holder as the current ticket holder; and
  (b) authorizing access to the event by (i) receiving, at a venue access point of the ticketing system, an instance of the ownership information identifying and authenticating the current ticket holder, the receiving being of the cell phone number as provided by the current ticket holder and thus free of use of a number specific to the ticketing system and by (ii) successfully comparing the received instance of the ownership information to the ownership information stored in the ownership record, the comparing being of the cell phone number as provided by the current ticket holder and thus free of use of a number specific to the ticketing system.

6. A computer program product providing access to an event after a paperless ticket exchange, comprising:
  a non-transitory computer readable medium having computer readable program code embodied therewith;
  the computer readable program code programming a computer to:
  (a) in a ticketing system:
    track a life cycle of an electronic ticket, the life cycle including any combination of: electronic ticket setup, sale of the electronic ticket to a ticket owner but not used by the ticket owner, resale of the electronic ticket by the ticket owner to a subsequent ticket buyer, and trade of the electronic ticket by subsequent ticket buyers, each of the ticket owner and each subsequent ticket buyer being a respective ticket holder;
    transfer ownership of the electronic ticket from one ticket holder to a subsequent ticket holder, said transferring including allowing multiple changes in ownership of the electronic ticket as traded throughout the life cycle of the electronic ticket from setup through multiple transfers in ownership; and create and electronically store in the ticketing system an ownership record for the electronic ticket, the ownership record including ownership information identifying and authenticating a current ticket holder, the ownership record associating new respective ownership information each time ownership of the electronic ticket is transferred, and the ownership record indicating the tracked life cycle of the electronic ticket from ticket setup through multiple transfers of ownership of the electronic ticket, wherein ticket setup is before the sale of the electronic ticket to the ticket owner, and wherein the ownership information is a credit card number or a cell phone number, as provided by a respective ticket holder to the ticketing system, the credit card number or cell phone number alone identifying and authenticating the respective ticket holder as the current ticket holder; and (b) authorize access to the event by (i) receiving, at a venue access point of the ticketing system, an instance of the ownership information identifying and authenticating the current ticket holder, the received instance being one of the credit card number and cell phone number as provided by the current ticket holder and thus free of use of a number specific to the ticketing system, and by (ii) successfully comparing the received instance of the ownership information to the ownership information stored in the ownership record, the comparing being of the credit card number or cell phone number as provided by the current ticket holder and thus free of use of a number specific to the ticketing system.

* * * * *